US012728918B2

(12) United States Patent
Park

(10) Patent No.: US 12,728,918 B2
(45) Date of Patent: Sep. 8, 2026

(54) FOUR-WHEEL INDEPENDENT STEERING SYSTEM AND VEHICLES INCLUDING SAME

(71) Applicants: Hyundai Motor Company, Seoul (KR); Kia Corporation, Seoul (KR)

(72) Inventor: Jeong Hwan Park, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/930,315

(22) Filed: Oct. 29, 2024

(65) Prior Publication Data

US 2025/0368258 A1 Dec. 4, 2025

(30) Foreign Application Priority Data

Jun. 4, 2024 (KR) ........................ 10-2024-0072830

(51) Int. Cl.
*B62D 7/18* (2006.01)
*B62D 7/16* (2006.01)
*B62D 7/20* (2006.01)

(52) U.S. Cl.
CPC ................. *B62D 7/18* (2013.01); *B62D 7/16* (2013.01); *B62D 7/20* (2013.01)

(58) Field of Classification Search
CPC .......... B62D 17/00; B62D 7/042; B62D 7/18; B62D 7/16; B62D 7/20; B60G 21/055; B60G 3/20
USPC ..................................................... 280/93.512
See application file for complete search history.

(56) References Cited

U.S. PATENT DOCUMENTS

| | | | | |
|---|---|---|---|---|
| 4,610,461 A * | 9/1986 | Guzzetta | B62D 7/00 | 280/124.134 |
| 6,974,141 B2 * | 12/2005 | Kim | B62D 7/18 | 280/93.502 |
| 7,914,020 B2 * | 3/2011 | Boston | B62D 9/04 | 280/124.136 |
| 9,114,682 B1 * | 8/2015 | Bandy | B62D 7/16 | |
| 11,299,200 B1 * | 4/2022 | Starik | B60G 7/02 | |
| 11,660,921 B2 * | 5/2023 | Moon | B60K 7/0007 | 180/65.51 |
| 12,220,958 B2 * | 2/2025 | Chang | B60G 7/04 | |
| 2011/0095502 A1 * | 4/2011 | Dada | B62D 7/22 | 280/124.127 |

FOREIGN PATENT DOCUMENTS

| | | | |
|---|---|---|---|
| KR | 10-0178945 A | 3/1998 | |
| WO | WO-2015144482 A1 * | 10/2015 | B62D 5/0418 |

* cited by examiner

*Primary Examiner* — Jason D Shanske
*Assistant Examiner* — Caitlin Anne Miller
(74) *Attorney, Agent, or Firm* — Banner & Witcoff, Ltd.

(57) ABSTRACT

An independent steering system includes a knuckle fastened to a wheel, an upper arm connected at both ends to an upper end of the knuckle and a steering frame, respectively, a lower arm connected at both ends to a lower end of the knuckle and the steering frame, respectively, and a tie rod connecting the knuckle and the steering frame to each other.

20 Claims, 13 Drawing Sheets

FIG. 6B 300
302
100
102
406
404
400
402

FIG. 7A 300
302
Lateral force
100
102
406
404
402
400

FOUR-WHEEL INDEPENDENT STEERING SYSTEM AND VEHICLES INCLUDING SAME

CROSS REFERENCE TO RELATED APPLICATION

The present application claims priority to Korean Patent Application No. 10-2024-0072830, filed on Jun. 4, 2024, the entire contents of which is incorporated herein for all purposes by this reference.

BACKGROUND

Some vehicles may steer road wheels in only two modes (straight forward, left/right turn), which allows for intuitive driving with fewer controls, while a four-wheel steering system (4WS) allows for independent control of each wheel, allowing for a variety of vehicle behaviors.

In a front and rear wheels driving mode, the road wheels turn as much as the steering wheel is turned, and the vehicle may be accelerated as much as the accelerator pedal is pressed, allowing the vehicle to turn while driving forward, and at this time, based on the vehicle speed, steering angle, or the like, it may be determined whether the rear wheels are steered in an opposite position to the front wheels, which may help the vehicle reduce the turning radius when making a U-turn.

In a diagonal travel mode, the rear wheels are steered in the same position as the front wheels to prevent the vehicle from yawing, which is advantageous in changing lanes or overtaking the front traveling vehicle.

In addition, in a parallel travel mode, the front and rear wheels are allowed to turn 90°, which is advantageous in parallel parking.

In addition, in a turn-in-place mode, the front and rear wheels may turn 45°, making it possible to make a U-turn in an alleyway.

On the other hand, although the parallel travel mode may be one of unusual driving modes of 4WS, so the parallel travel mode may be differentiated from existing vehicles and appeal to customers, the parallel travel mode has a problem in that the bump steering characteristic, which is defined as a mechanism that changes the toe value of the wheel upon the wheel's up and down motion, changes depending on the turning direction of wheels, so the traveling operation of the vehicle may become unstable during traveling, which makes the driver feel uncomfortable.

The matters described in this Background section are only for enhancement of understanding of the background of the disclosure, and should not be taken as acknowledgement that they correspond to prior art already known to those skilled in the art.

SUMMARY

One or more aspects of the present disclosure relates to an independent steering system and a vehicle including the same (e.g., an independent steering system capable of ensuring driving stability of the vehicle in a specialized traveling mode).

The present disclosure has been made in an effort to solve the above-described problems, and an objective of the present disclosure is to provide an independent steering system including a tie rod having a first connection connected to a knuckle and a second connection extending from the first connection and positioned in a guide slot of a steering arm, wherein the second connection is selectively moved along a longitudinal direction of the guide slot to differentiate the bump steering characteristic based on the relative position of the first and second connections to allow the bumper steer characteristic, which varies according to the turning direction of wheels in the parallel travel mode, to be stationary, thereby ensuring vehicle traveling stability.

An independent steering system for a wheel of a vehicle may comprise: a knuckle configured to be fastened to the wheel; an upper arm, wherein a first end of the upper arm is coupled to an upper end of the knuckle and a second end of the upper arm is coupled to a steering frame; a lower arm, wherein a first end of the lower arm is coupled to a lower end of the knuckle and a second end of the lower arm is coupled to the steering frame; and a tie rod, wherein a first end of the tie rod is coupled to the knuckle and a second end of the tie rod is coupled to the steering frame, wherein a height of the second end of the tied rod is configured to be adjustable.

A position of the tie rod may be associated with a bump steering characteristic of the wheel.

The first end of the tie rod may be pivotably connected to a connection member extending unilaterally from the knuckle, and the second end of the tie rod may be configured to move along a path of a guide slot provided in the steering frame such that as a position of the second end of the tie rod is varied relative to the first end of the tie rod, a bump steering characteristic of the wheel is changed.

The tie rod may be configured such that when the second end of the tie rod is positioned above the first end of the tie rod, the bump steering characteristic of the wheel is determined as oversteering.

The tie rod may be configured such that when the second end of the tie rod is positioned below the first end of the tie rod, the bump steering characteristic of the wheel is determined as understeering.

The tie rod may comprise: a body part having the first end of the tie rod and the second end of the tie rod; and a fixture passing through the guide slot and fastened into a fastening hole provided in the second end to fix a variable position of the second end of the tie rod in the guide slot.

The guide slot may be formed in an arc shape to allow the second end of the tie rod to move along a path of the arc shape.

The first end of the tie rod may be pivotably connected to a connection member extending unilaterally from the knuckle, and the second end of the tie rod may be connected to the steering frame by a first bushing. The upper arm and the lower arm may be connected to the steering frame by a second bushing. Bump steering characteristic of the wheel may be determined by a difference in stiffness of the first bushing and the second bushing.

The tie rod may be configured such that when stiffness of the first bushing is relatively greater than the stiffness of the second bushing, the bump steering characteristic of the wheel is determined as oversteering.

The tie rod may be configured such that when stiffness of the first bushing is relatively smaller than the stiffness of the second bushing, the bump steering characteristic of the wheel is determined as understeering.

The independent steering system may further comprise: a controller configured to control the independent steering system to align bump steering characteristic of the wheel with bump steering characteristic of another wheel of the vehicle.

The aligning of the bump steering characteristic of the wheel may be performed by adjusting the height of the second end of the tied rod.

A vehicle may comprise: a plurality of independent steering systems, wherein each of the plurality of independent steering systems comprises: a knuckle configured to be fastened to a corresponding wheel of the vehicle; an upper arm, wherein a first end of the upper arm is coupled to an upper end of the knuckle and a second end of the upper arm is coupled to a steering frame; a lower arm, wherein a first end of the lower arm is coupled to a lower end of the knuckle and a second end of the lower arm is coupled to the steering frame; and a tie rod, wherein a first end of the tie rod is coupled to the knuckle and a second end of the tie rod is coupled to the steering frame, wherein a height of the second end of the tied rod is configured to be adjustable; a processor configured to determine a travel mode; and a controller configured to control each of the independent steering systems such that as the travel mode is switched, each of the wheels of the vehicle has a same bump steering characteristic.

The controller may be configured to control each of the independent steering systems to vary bump steering characteristic of at least one wheel of the wheels of the vehicle based on a change of a rotation direction of the at least one wheel and based on switching of the travel mode.

The first end of the tie rod may be pivotably connected to a connection member extending unilaterally from the knuckle, and the second end of the tie rod may be configured to move along a path of a guide slot provided in the steering frame such that as a position of the second end of the tie rod is varied relative to the first end of the tie rod, a bump steering characteristic of the corresponding wheel is changed.

The tie rod may be configured such that when the second end of the tie rod is positioned above the first end of the tie rod, the bump steering characteristic of the corresponding wheel is determined as oversteering.

The tie rod may be configured such that when the second end of the tie rod is positioned below the first end of the tie rod, the bump steering characteristic of the corresponding wheel is determined as understeering.

The guide slot may be formed in an arc shape to allow the second end of the tie rod to move along a path of the arc shape.

According to the present disclosure, the independent steering system is configured to include the tie rod having the first connection connected to the knuckle and the second connection extending from the first connection and positioned in the guide slot of the steering arm, and the second connection is selectively moved along a longitudinal direction of the guide slot to differentiate the bump steering characteristic based on the relative position of the first and second connections to allow the bumper steer characteristic, which varies according to the turning direction of wheels in the parallel travel mode, to be stationary, thereby ensuring vehicle traveling stability.

According to the present disclosure, the second connection is lowered below the first connection from the guide slot so that the bump steering characteristic is determined as understeering, and the second connection is raised above the first connection from the guide slot so that the bump steering characteristic is determined as oversteering, providing the effect of enabling the bump steering characteristic to be easily varied by only the operation of raising and lowering the second connection from the guide slot in a special travel mode.

BRIEF DESCRIPTION OF THE DRAWINGS

FIGS. 6A and 6B and FIGS. 7A and 7B are views illustrating the bump steering characteristic as a function of stiffness of a bushing for an independent steering system according to an example of the present disclosure.

DETAILED DESCRIPTION

Hereinafter, various examples of the present disclosure will be described in detail with reference to the accompanying drawings.

The advantages and features of the present disclosure, together with methods of achieving them, will become apparent upon reference to embodiments to be described below in detail with reference to the accompanying drawings.

However, the present disclosure is not intended to be limited by the illustrated examples disclosed herein, but will be embodied in many different forms, and these embodiment (s) is/are provided merely to make the present disclosure complete and to give those of ordinary skill in the art, to which the present disclosure belongs, a complete idea of the scope of the present disclosure, which is defined by the claims.

Furthermore, in describing the present disclosure, if it is deemed that relevant known technologies and the like would obscure the gist of the present disclosure, a detailed description thereof will be omitted.

Figure 1A:
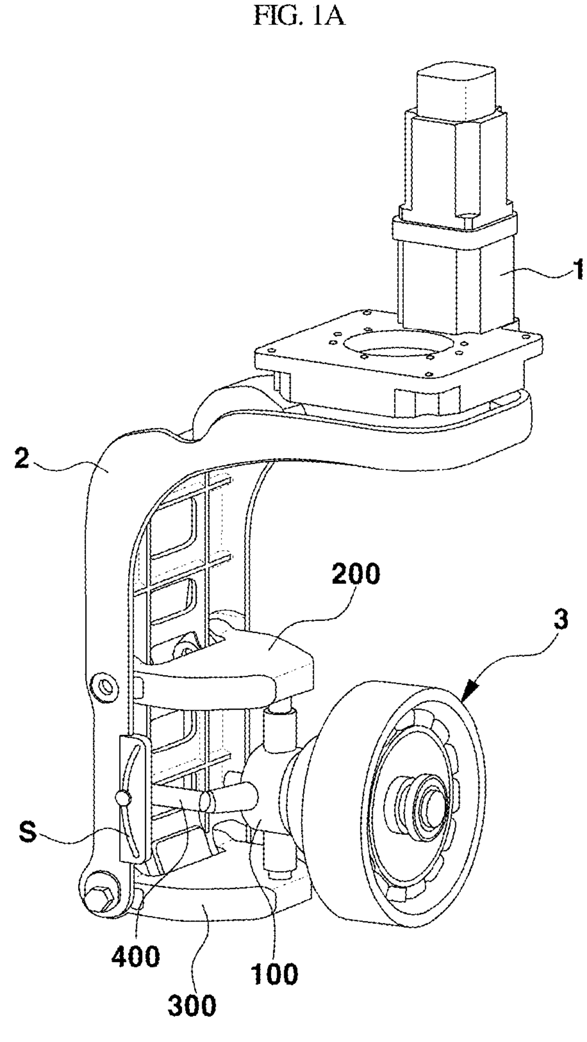
FIGS. 1A and 1B are views illustrating an independent steering system according to an example of the present disclosure.
Figure 1B:
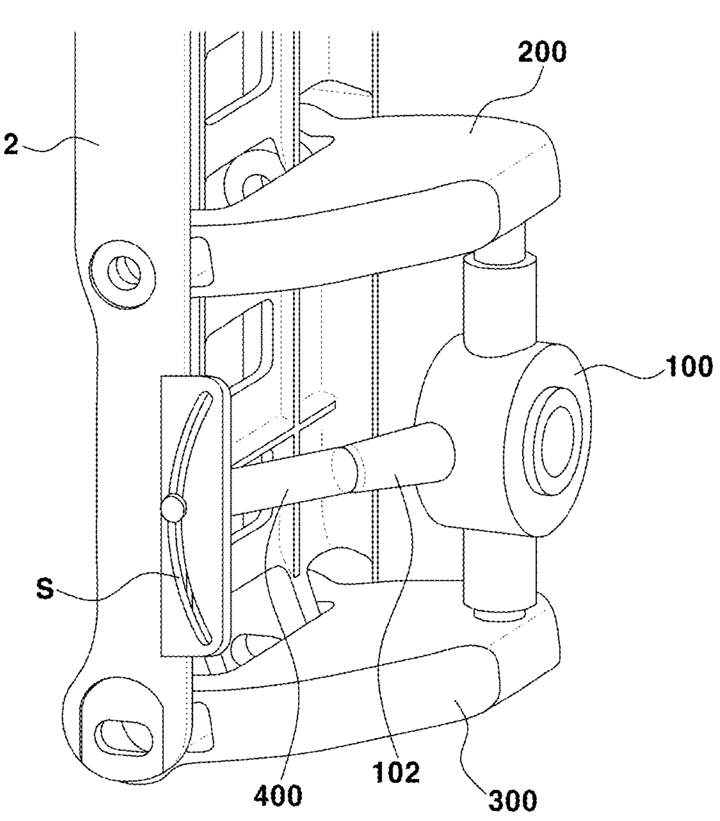
Figure 2A:
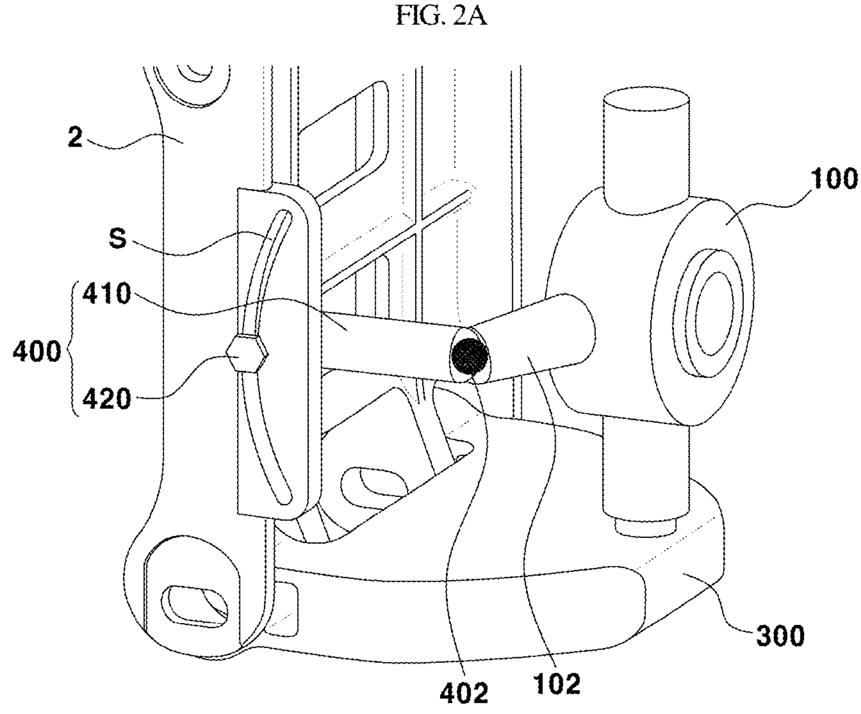
FIGS. 2A and 2B are views illustrating a tie rod and a guide slot formed in a steering frame according to an example of the present disclosure.
Figure 2B:
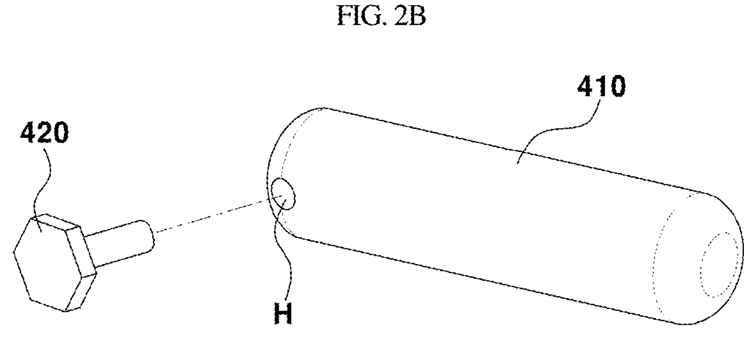

FIGS. 1A and 1B are views illustrating an independent steering system according to an example of the present disclosure, and FIGS. 2A and 2B are views illustrating a tie rod and a guide slot formed in a steering frame according to an example of the present disclosure.

Figure 3:
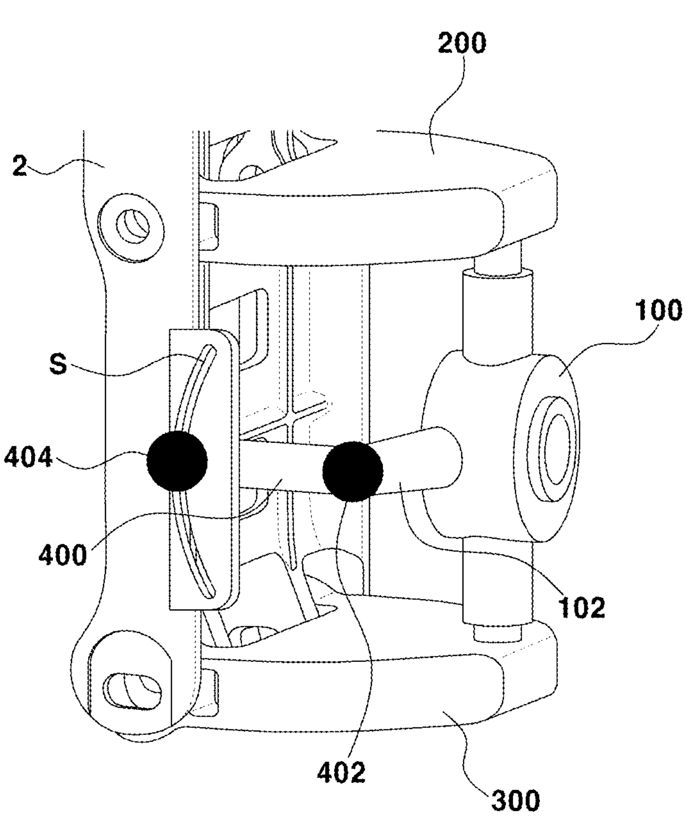
FIG. 3 is a view illustrating the bump steering characteristic of neutral steer for an independent steering system according to an example of the present disclosure.
Figure 4:
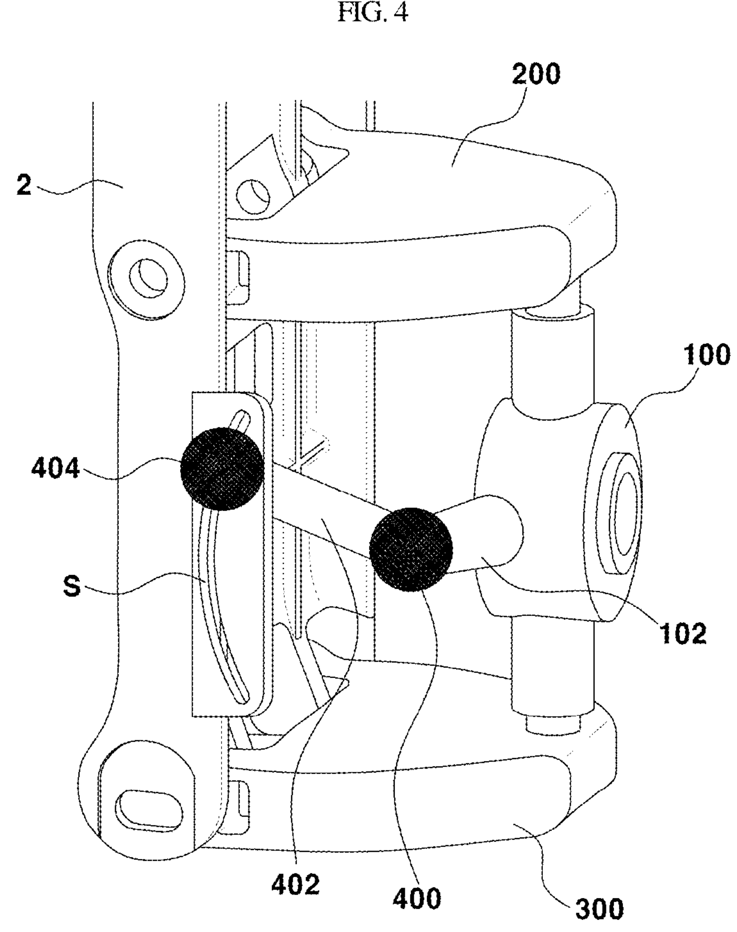
FIG. 4 is a view illustrating the bump steering characteristic of oversteering for an independent steering system according to an example of the present disclosure.

FIG. 3 is a view illustrating the bump steering characteristic of neutral steer for an independent steering system according to an example of the present disclosure, and FIG. 4 is a view illustrating the bump steering characteristic of oversteering for an independent steering system according to an example of the present disclosure.

Figure 5:
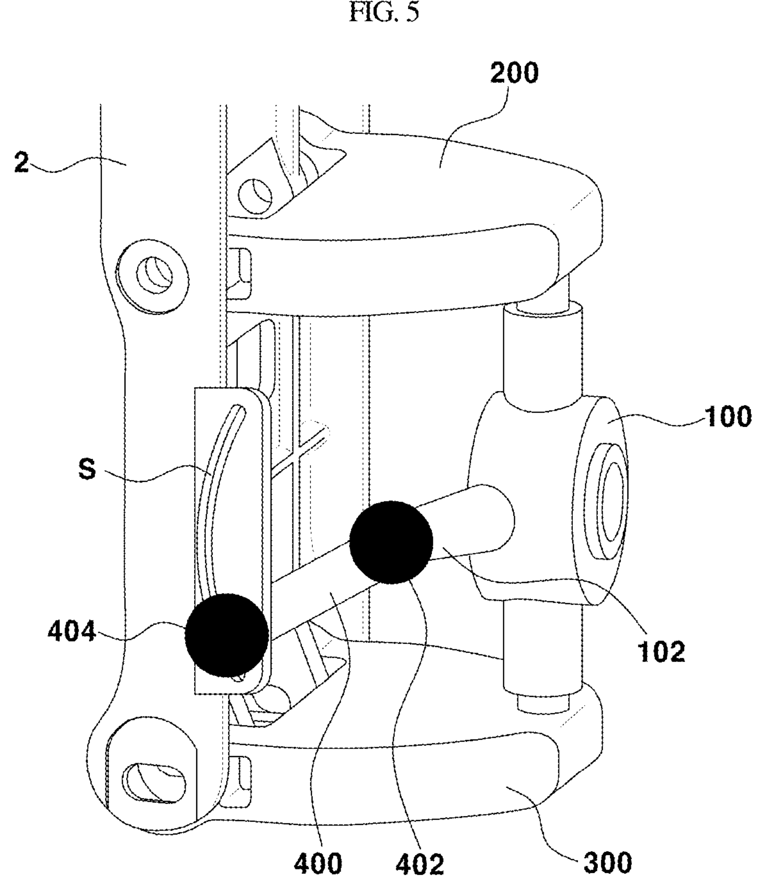
FIG. 5 is a view illustrating the bump steering characteristic of understeering for an independent steering system according to an example of the present disclosure.

FIG. 5 is a view illustrating the bump steering characteristic of understeering for an independent steering system according to an example of the present disclosure, and FIGS. 6A and 6B and FIGS. 7A and 7B are views illustrating the bump steering characteristic as a function of stiffness of a bushing for an independent steering system according to an example of the present disclosure.

The independent steering system may refer to a single steering system that is coupled to each wheel, so in the case of a multi-wheeled vehicle, each wheel may be provided with an independent steering system capable of independent steering.

A vehicle equipped with an independent steering system may be a vehicle having a symmetrical shape in front-toback and left-to-right directions (e.g., a vehicle having a neutral steer characteristic in response to an input of steering angle through a steering motor 1, for example, as shown in FIG. 1A).

The independent steering system may include a knuckle 100, an upper arm 200, a lower arm 300, and a tie rod 400, for example, as illustrated in FIG. 1A.

The knuckle 100 may be located between the upper arm 200 and the lower arm 300, and a wheel 3 including a drive motor may be fastened on an outer side of the knuckle 100.

The knuckle 100 may be fastened to each of the upper arm 200 and the lower arm 300 (e.g., via a ball joint (not illustrated) between the upper arm 200 and the lower arm 300), such that the knuckle moves up and down together with the upper arm 200 and the lower arm 300 in the event of a bump.

The upper arm 200 and the lower arm 300 may be spaced apart (e.g., in the vertical direction, a horizontal direction, or any other direction), so that their respective first ends are pivotably fastened to a steering frame 2, and between their respective second ends, the knuckle 100 may be fastened by the ball joint (not illustrated).

The tie rod 400 may be formed to connect the knuckle 100 and the steering frame 2 so as to differentiate a bump steering characteristic for each of the wheels, more specifically, understeering where the front side of the wheel turns outwardly from the vehicle and oversteering where the front side of the wheel turns inwardly from the vehicle.

Such a tie rod 400 may be formed as an extension having a predetermined length, including a first end 402 combined with the knuckle 100 by a ball joint (not illustrated) and a second end 404 combined with the steering frame 2, so as to connect the knuckle 100 and the steering frame 2.

The tie rod 400 may determine the bump steering characteristic as the position of the second end 404 coupled to (e.g., movably fastened to) the steering frame 2 is varied vertically relative to the first end 402, which may be pivotably fastened to a connection member 102 (e.g., protruding unilaterally from the center of the knuckle 100).

As such, for variable positioning of the second end 404, the steering frame 2 may be provided with a guide slot S, as illustrated in FIG. 2A. Specifically, the guide slot S may be formed in an arc shape such that the position of the first end 402, which is the center of rotation of the tie rod 400, remains the same when the position of the second end 404 is varied (i.e., the toe value does not change).

Continuing to refer to FIG. 2A, the tie rod 400 may include a body part 410 and a fixture 420.

The body part 410 may be an extension having the first end 402 and the second end 404, and the fixture 420 may be a fastener that is formed to fix a variable position of the second end 404 in the guide slot S by fastening into a fastening hole H provided in the second end 404 (after passing through the guide slot S), as illustrated in FIG. 2B.

As illustrated in FIG. 3, the tie rod 400 may vary the bump steering characteristic of the steering system from neutral steer to oversteering or understeering by moving the position of the second end 404 in the guide slot S.

In other words, as illustrated in FIG. 1B, upon occurrence of a bump, the first end 402 and the second end 404 may be forced to move away from each other, causing the knuckle 100 to turn to compensate for this force, resulting in bump steering. At this time, the position of the second end 404 may be adjusted to cause the knuckle 100 to turn to the left or right upon the occurrence of a bump, thereby independently providing the bump steering characteristic of oversteering or understeering for each of the plurality of wheels.

In a first aspect, when the steering system of the front right wheel turns to the right so that the second end 404 is moved upwardly in the guide slot S to a position that is relatively higher than the position of the first end 402, as illustrated in FIG. 4, the bump steering characteristic may be determined to be oversteering when a bump occurs.

In other words, when the position of the second end 404 is relatively higher than the position of the first end 402, the distance from the second end 404 to the first end 402 increases, which may push the knuckle 100 away from the first end 402, thereby causing the knuckle 100 to turn to the left when a bump occurs, which in turn may determine the bump steering characteristic of oversteering.

In a second aspect, when the steering system of the front right wheel turns to the right so that the second end 404 is moved downwardly in the guide slot S to a position that is relatively lower than the position of the first end 402, as illustrated in FIG. 5, the bump steering characteristic may be determined to be understeering when a bump occurs.

In other words, when the position of the second end 404 is relatively lower than the position of the first end 402, the distance from the second end 404 to the first end 402 increases, which may pull the knuckle 100 close to the first end 402, thereby causing the knuckle 100 to turn to the right when a bump occurs, which in turn may determine the bump steering characteristic of understeering.

While the bump steering characteristic may be varied by adjusting the relative height between the first end 402 and the second end 404 as described above, the bump steering characteristic may also be varied by varying the stiffness of the bushings 302, 406, as illustrated in FIGS. 6A and 6B and FIGS. 7A and 7B.

Figure 6A:
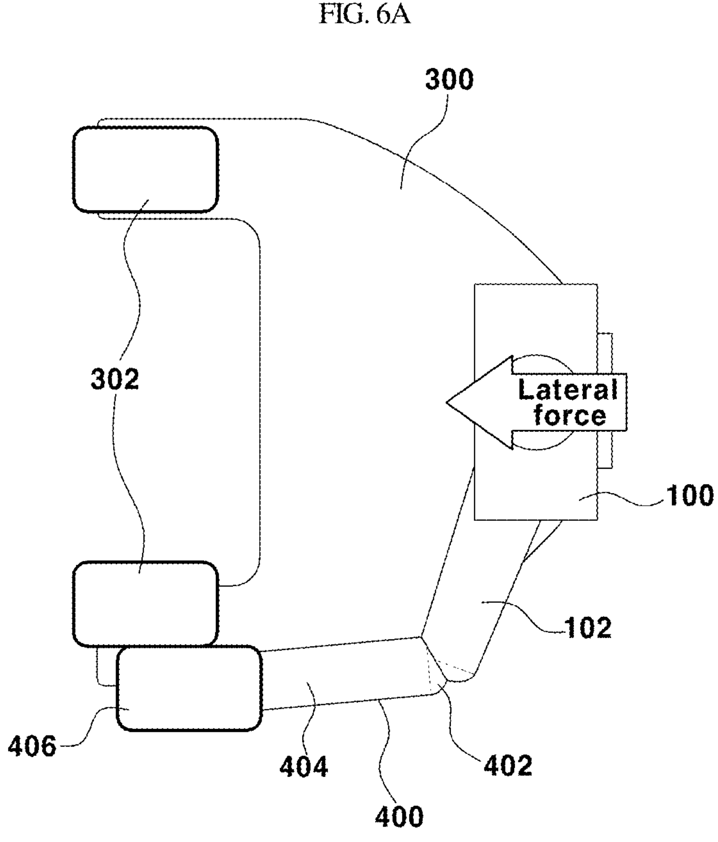

For example, as illustrated in FIG. 6A, in a tie rod 400, a first end 402 may be pivotably fastened to a connection member 102 extending unilaterally from the center of the knuckle 100, a second end 404 fastened to the steering frame 2 may be fixed by a first bushing 406, and an upper arm 200 and a lower arm 300 coupled to the steering frame 2 may be secured by second bushings 302.

Here, for example, if the stiffness of the first bushing 406 is relatively larger than the stiffness of the second bushing 302, when a lateral force is applied in the direction of arrow as a turning is made in the right direction, the second bushing 302 is compressed relatively much due to the difference in stiffness, causing the lower arm 300 (including the upper arm 200) to move to the left, but the first bushing 406 is not compressed relatively due to the difference in stiffness, i.e., has no change, thereby maintaining the same position.

Figure 6B:
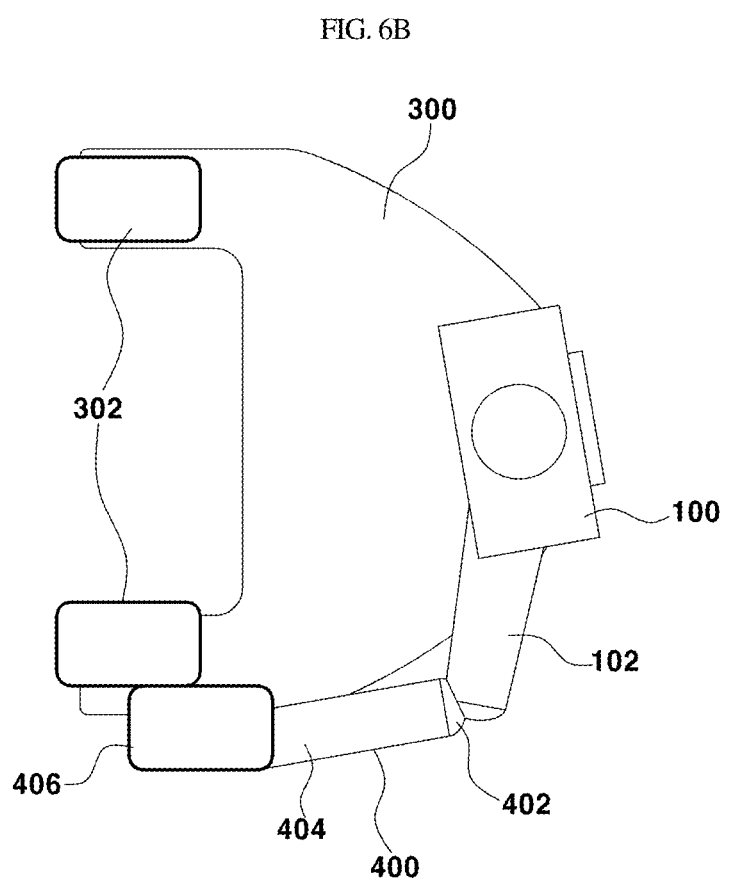

Thus, as illustrated in FIG. 6B, since the applied lateral force causes the lower arm 300 to move to the left, while the tie rod 400 remains unchanged in position, the lower arm 300 moves to the left relative to the tie rod 400, causing the knuckle 100 to turn counterclockwise so that the knuckle turns to the left upon the application of the lateral force, thereby determining the bump (lateral force) steering characteristic of oversteering.

Figure 7A:
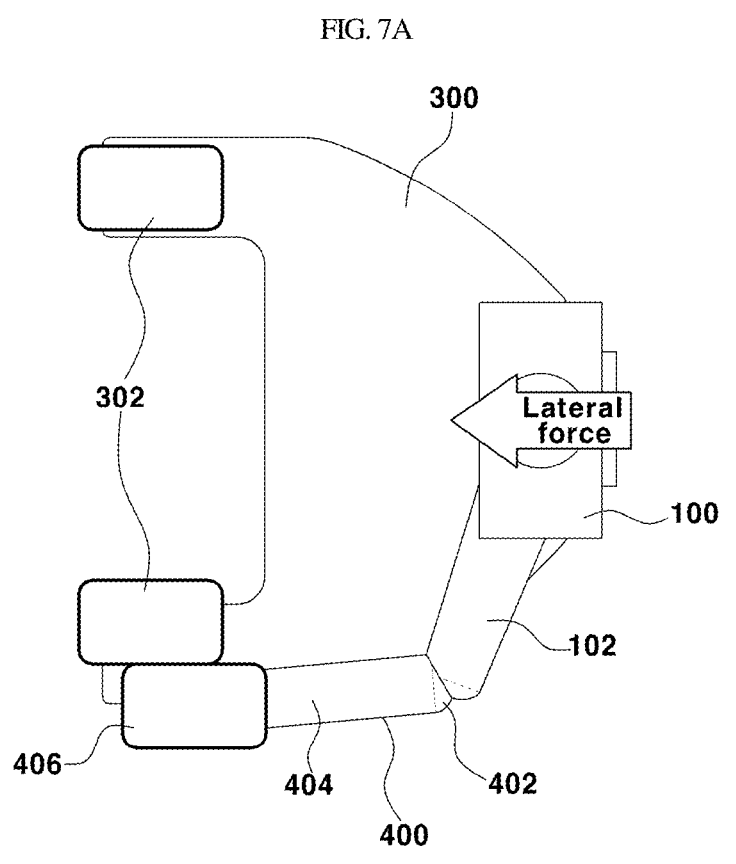

Conversely, as illustrated in FIG. 7A, for example, if the stiffness of the first bushing 406 is 50 and the stiffness of the second bushing 302 is 100 so that the stiffness of the second bushing 302 is relatively larger than the stiffness of the first bushing 406, when a lateral force is applied in the direction of arrow as a turning is made in the right direction, the first bushing 406 is compressed relatively much due to the stiffness, causing the tie rod 400 to move to the left, but the second bushing 302 is not compressed relatively due to the stiffness, i.e., has no change, thereby maintaining the lower arm 300 (including the upper arm 200) in the same position.

Figure 7B:
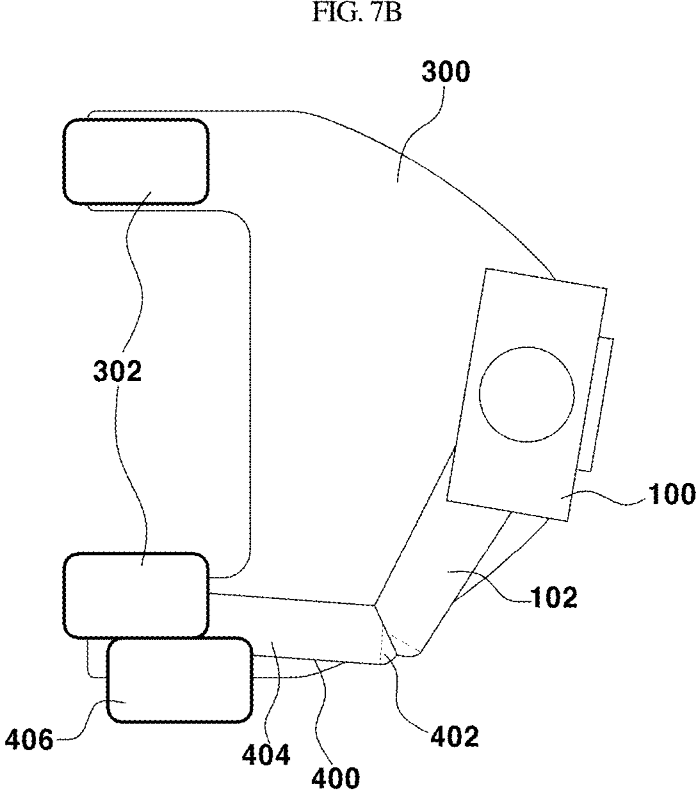

Thus, as illustrated in FIG. 7B, since the applied lateral force causes the tie rod 400 to move to the left, while the lower arm 300 remains unchanged in position, the tie rod 400 moves to the left relative to the lower arm 300, causing the knuckle 100 to turn clockwise so that the knuckle turns to the right upon the application of the lateral force, thereby determining the bump (lateral force) steering characteristic of oversteering.

Figure 8A:
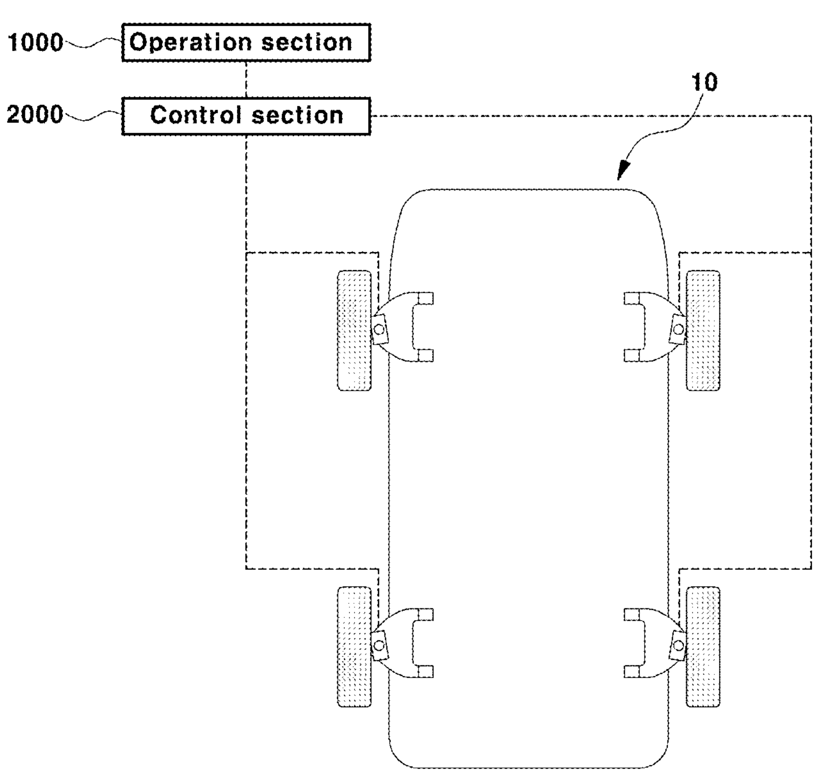
FIGS. 8A, 8B, and 8C are views illustrating individual control of a vehicle independent steering system according to an example of the present disclosure.
Figure 8B:
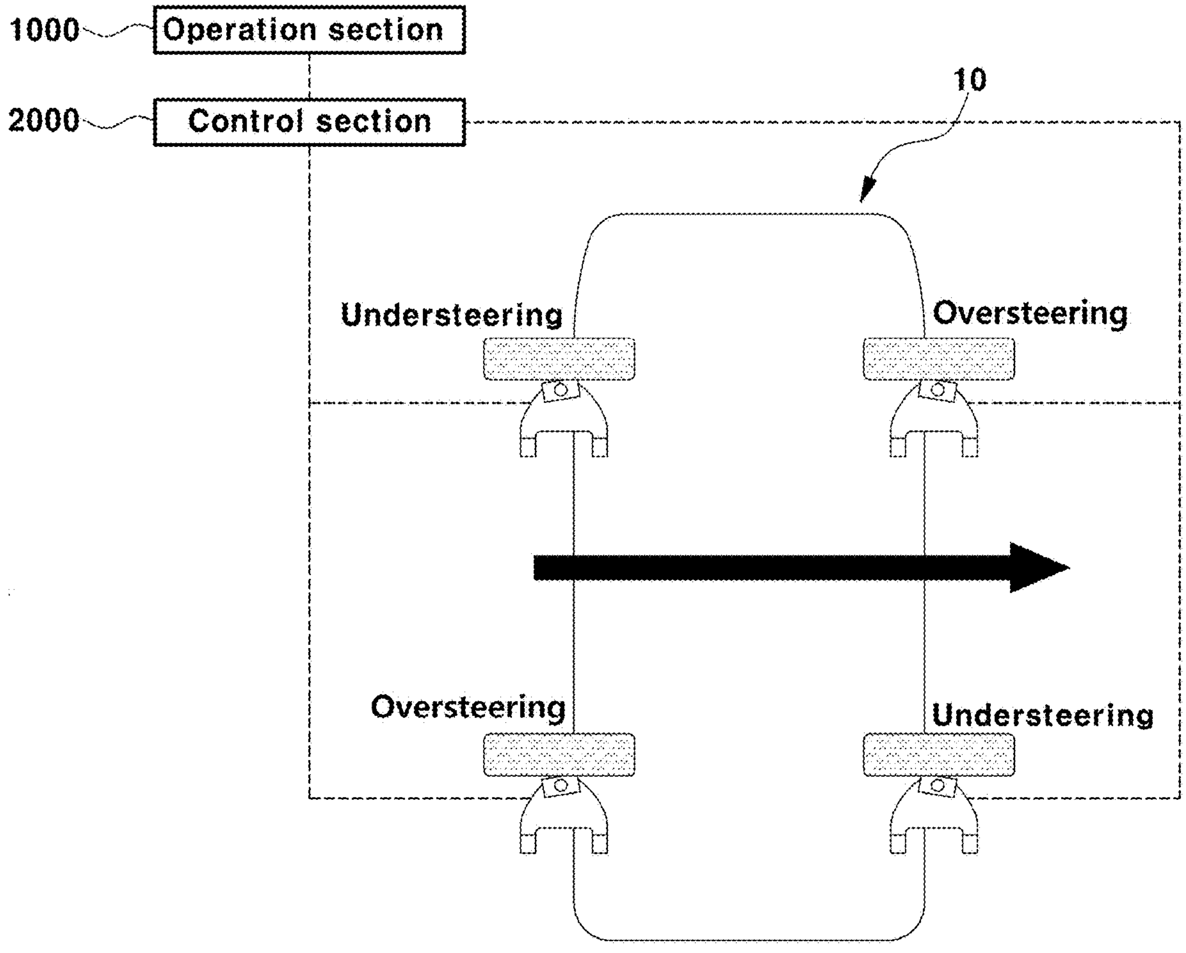
Figure 8C:
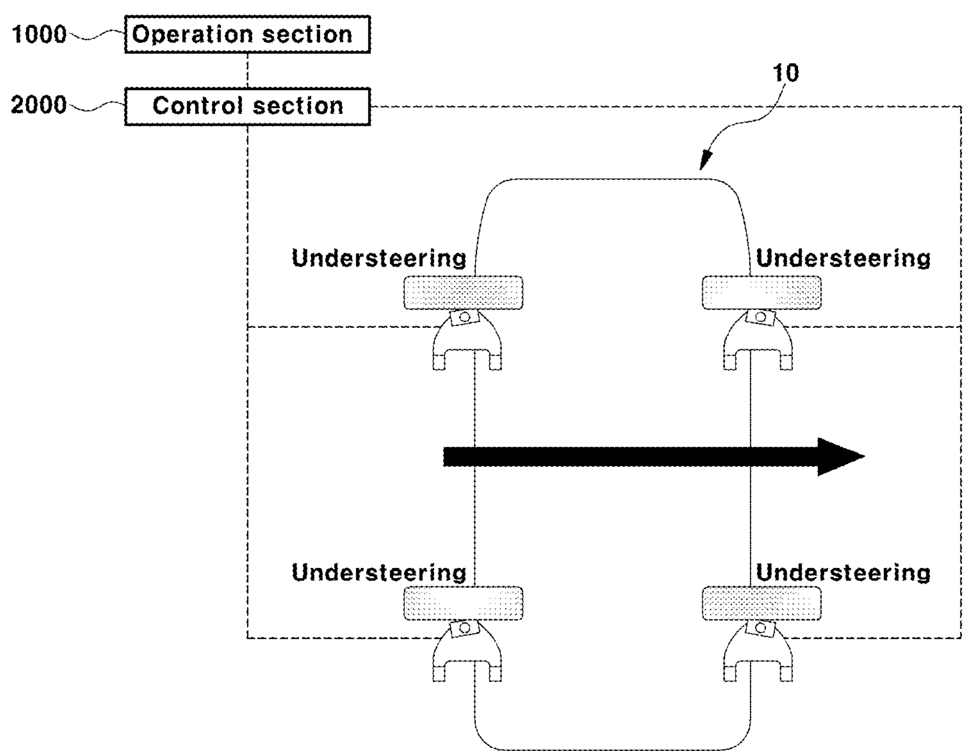

Furthermore, as illustrated in FIGS. 8A to 8C, a vehicle 10 may include a controller 2000 for individually controlling independent steering systems according to the aforementioned configuration(s) for each of the plurality of wheels.

The vehicle 10 may include an operation unit 1000 (e.g., one or more processors and memory storing instructions that cause an apparatus to perform one or more operations below) for determining any one of travel modes, including a parallel travel mode, and the controller 2000 for individually controlling the independent steering systems such that as the travel mode is switched to the parallel travel mode, as illustrated in FIGS. 8A and 8B, the bump steering characteristic for each of the plurality of wheels may be equalized by the operation unit 1000.

To this end, the controller 2000 may variably control, in real time, the position of the tie rod 400 included in each of the independent steering systems in order to vary the bump steering characteristic for any one of the front-left and front-right wheels and any one of the rear-left and rear-right wheels, as the operation unit 1000 switches the travel mode to the parallel travel mode.

In other words, for a vehicle 10 having a bump steering characteristic of understeering, when the travel mode is switched to the parallel travel mode and the vehicle is moved to the right as illustrated in FIG. 8B, the front left wheel and the rear right wheel are driven in the same direction as in the state before the switch as illustrated in FIG. 8A, whereas the front right wheel and the rear left wheel are driven in the opposite direction as in FIG. 8A, so that the bump steering characteristic is variably changed from understeering to oversteering.

Accordingly, the controller 2000 variably controls the position of the front right wheel and the rear left wheel with respect to the tie rods 400 in real time, so that the bump steering characteristic is variably changed to the understeering characteristic as in the front left wheel and the rear right wheel.

Under the control of the controller 2000 as described above, even upon switching to the parallel travel mode, as illustrated in FIG. 8C, the bump steering characteristic for each of the plurality of wheels has the same understeering bump steering characteristic as before the switch, thereby preventing problems of unstable driving such as wobbling caused by differentiated bump steering characteristic occurring during the parallel travel mode of the vehicle 10.

For example, the controller 2000 may control, in real time, the steering systems of the front right wheel and the rear left wheel such that the second end 404 of the tie rod 400 is moved downwardly in the guide slot S so that the second end 404 is positioned at a position relatively lower than the position of the first end 402, thereby variably changing the bump steering characteristic to the understeering characteristic (see FIG. 5).

Further, for a vehicle 10 having a bump steering characteristic of understeering, when the travel mode is switched to the parallel travel mode and the vehicle is moved to the left, the front right wheel and the rear left wheel are driven in the same direction as in the state before the switch, whereas the front left wheel and the rear right wheel are driven in the opposite direction, so that the bump steering characteristic is variably changed from understeering to oversteering.

Accordingly, the controller 2000 variably controls the position of the front left wheel and the rear right wheel with respect to the tie rods 400 in real time, so that the bump steering characteristic is variably changed to the understeering characteristic as in the front right wheel and the rear left wheel.

Under the control of the controller 2000 as described above, even upon switching to the parallel travel mode, the bump steering characteristic for each of the plurality of wheels has the same understeering bump steering characteristic as before the switch, thereby preventing problems of unstable driving such as wobbling caused by differentiated bump steering characteristic occurring during the parallel travel mode of the vehicle 10.

For example, the controller 2000 may control, in real time, the steering systems of the front left wheel and the rear right wheel such that the second end 404 of the tie rod 400 is moved downwardly in the guide slot S so that the second end 404 is positioned at a position relatively lower than the position of the first end 402, thereby variably changing the bump steering characteristic to the understeering characteristic (see FIG. 5).

On the other hand, although not illustrated, in the case of a vehicle 10 having a bump steering characteristic of oversteering, when the travel mode is switched to the parallel travel mode and the vehicle is moved to the right, the bump steering characteristic of the front right wheel and the rear left wheel are variably changed to the understeering characteristic, so the controller variably controls in real time the position of the front right wheel and the rear left wheel with respect to the tie rods 400 to allow the bump steering characteristic to be the oversteering characteristic as in the front left wheel and the rear right wheel.

For example, the controller 2000 may control, in real time, the steering systems of the front right wheel and the rear left wheel such that the second end 404 of the tie rod 400 is moved upwardly in the guide slot S so that the second end 404 is positioned at a position relatively higher than the position of the first end 402, thereby variably changing the bump steering characteristic to the oversteering characteristic (see FIG. 4).

Further, for a vehicle 10 having a bump steering characteristic of oversteering, when the travel mode is switched to the parallel travel mode and the vehicle is moved to the left, the front right wheel and the rear left wheel are driven in the same direction as in the state before the switch, whereas the front left wheel and the rear right wheel are driven in the opposite direction, so that the bump steering characteristic is variably changed from oversteering to understeering.

Accordingly, the controller 2000 variably controls the position of the front left wheel and the rear right wheel with respect to the tie rods 400 in real time, so that the bump steering characteristic is variably changed to the oversteering characteristic as in the front right wheel and the rear left wheel.

Under the control of the controller 2000 as described above, even upon switching to the parallel travel mode, the bump steering characteristic for each of the plurality of wheels has the same oversteering bump steering characteristic as before the switch, thereby preventing problems of unstable driving such as wobbling caused by differentiated bump steering characteristic occurring during the parallel travel mode of the vehicle 10.

For example, the controller 2000 may control, in real time, the steering systems of the front left wheel and the rear right wheel such that the second end 404 of the tie rod 400 is moved upwardly in the guide slot S so that the second end 404 is positioned at a position relatively higher than the position of the first end 402, thereby variably changing the bump steering characteristic to the oversteering characteristic (see FIG. 4).

According to the present disclosure, the independent steering system is configured to include the tie rod having the first connection connected to the knuckle and the second connection extending from the first connection and positioned in the guide slot of the steering arm, and the second connection is selectively moved along a longitudinal direction of the guide slot to differentiate the bump steering characteristic based on the relative position of the first and second connections to allow the bumper steer characteristic, which varies according to the turning direction of wheels in the parallel travel mode, to be stationary, thereby ensuring vehicle traveling stability.

According to the present disclosure, the second connection is lowered below the first connection from the guide slot so that the bump steering characteristic is determined as understeering, and the second connection is raised above the first connection from the guide slot so that the bump steering characteristic is determined as oversteering, providing the effect of enabling the bump steering characteristic to be easily varied by only the operation of raising and lowering the second connection from the guide slot in a special travel mode.

In an aspect of the present disclosure, there is provided an independent steering system including: a knuckle fastened to a wheel, an upper arm connected at both ends to an upper end of the knuckle and a steering frame, respectively, a lower arm connected at both ends to a lower end of the knuckle and the steering frame, respectively, and a tie rod connecting the knuckle and the steering frame to each other.

The tie rod may determine the bump steering characteristic of the wheel.

The tie rod may include a first end pivotably connected to a connection member extending unilaterally from the knuckle, and a second end connected to a guide slot provided in the steering frame such that as the position of the second end is varied relative to the first end, the bump steering characteristic of the wheel is determined.

The tie rod may be configured so that when the second end is positioned above the first end, the bump steering characteristic of the wheel is determined as oversteering.

The tie rod may be configured so that when the second end is positioned below the first end, the bump steering characteristic of the wheel is determined as understeering.

The tie rod may include a body part having the first end and the second end, and a fixture passing through the guide slot and fastened into a fastening hole provided in the second end to fix a variable position of the second end in the guide slot.

The guide slot may be formed in an arc shape to allow the second end to move therein about the first end.

The tie rod may include a first end pivotably connected to a connection member extending unilaterally from the knuckle, and a second end connected to the steering frame by a first bushing, wherein the upper arm and the lower arm are connected to the steering frame by a second bushing, and the bump steering characteristic of the wheel is determined by the difference in stiffness of the first bushing and the second bushing.

The tie rod may be configured such that when stiffness of the first bushing is relatively greater than the stiffness of the second bushing, the bump steering characteristic of the wheel is determined as oversteering.

The tie rod may be configured such that when stiffness of the first bushing is relatively smaller than the stiffness of the second bushing, the bump steering characteristic of the wheel is determined as understeering.

In another aspect of the present disclosure, there is provided a vehicle including the independent steering system according to claim 1, an operation unit determining a travel mode, and a controller individually controlling the independent steering system such that as the travel mode is switched by the operation unit, the bump steering characteristic for each of the wheels has the same steering characteristic.

The controller may control the independent steering system in real time to vary the bump steering characteristic for any one of the front left and right wheels and any one of the rear left and right wheels upon switching of the travel mode to a parallel travel mode by the operation unit.

The independent steering system may include a knuckle fastened to a wheel, an upper arm connected at both ends to an upper end of the knuckle and a steering frame, respectively, a lower arm connected at both ends to a lower end of the knuckle and the steering frame, respectively, and a tie rod connecting the knuckle and the steering frame to each other and determining the bump steering characteristic of the wheel.

The tie rod may include a first end pivotably connected to a connection member extending unilaterally from the knuckle, and a second end connected to a guide slot provided in the steering frame such that as the position of the second end is varied relative to the first end, the bump steering characteristic of the wheel is determined.

The tie rod may be configured so that when the second end is positioned above the first end, the bump steering characteristic of the wheel is determined as oversteering.

The tie rod may be configured so that when the second end is positioned below the first end, the bump steering characteristic of the wheel is determined as understeering.

The guide slot may be formed in an arc shape to allow the second end to move therein about the first end.

While the foregoing disclosure has been described with reference to the embodiment(s) illustrated in the drawings, the embodiment is merely for illustrative purposes, and those having ordinary knowledge in the art will understand that various modifications may be made therefrom, and that all or any part of the embodiment(s) described above may be optionally combined. Therefore, the true technical scope of the disclosure is to be determined by the technical ideas of the appended claims.

What is claimed is:

1. An independent steering system for a wheel of a vehicle, the independent steering system comprising:

a knuckle configured to be fastened to the wheel;

an upper arm, wherein a first end of the upper arm is coupled to an upper end of the knuckle and a second end of the upper arm is coupled to a steering frame;

a lower arm, wherein a first end of the lower arm is coupled to a lower end of the knuckle and a second end of the lower arm is coupled to the steering frame; and a tie rod, wherein a first end of the tie rod is coupled to the knuckle and a second end of the tie rod is coupled to the steering frame, wherein a height of the second end of the tied rod is configured to be adjustable, wherein the first end of the tie rod is pivotably connected to a connection member extending unilaterally from the knuckle, and the second end of the tie rod is configured to move along a path of a guide slot provided in the steering frame.

2. The independent steering system of claim 1, wherein a position of the tie rod is associated with a bump steering characteristic of the wheel.

3. The independent steering system of claim 1, wherein a bump steering characteristic of the wheel is changed as a position of the second end of the tie rod is varied relative to the first end of the tie rod.

4. The independent steering system of claim 3, wherein the tie rod is configured such that when the second end of the tie rod is positioned above the first end of the tie rod, the bump steering characteristic of the wheel is determined as oversteering.

5. The independent steering system of claim 3, wherein the tie rod is configured such that when the second end of the tie rod is positioned below the first end of the tie rod, the bump steering characteristic of the wheel is determined as understeering.

6. The independent steering system of claim 3, wherein the tie rod comprises:

a body part having the first end of the tie rod and the second end of the tie rod; and a fixture passing through the guide slot and fastened into a fastening hole provided in the second end to fix a variable position of the second end of the tie rod in the guide slot.

7. The independent steering system of claim 3, wherein the guide slot is formed in an arc shape to allow the second end of the tie rod to move along a path of the arc shape.

8. An independent steering system for a wheel of a vehicle, the independent steering system comprising:

a knuckle configured to be fastened to the wheel;

an upper arm, wherein a first end of the upper arm is coupled to an upper end of the knuckle and a second end of the upper arm is coupled to a steering frame;

a lower arm, wherein a first end of the lower arm is coupled to a lower end of the knuckle and a second end of the lower arm is coupled to the steering frame; and a tie rod, wherein a first end of the tie rod is coupled to the knuckle and a second end of the tie rod is coupled to the steering frame, wherein a height of the second end of the tied rod is configured to be adjustable, wherein the first end of the tie rod is pivotably connected to a connection member extending unilaterally from the knuckle, and the second end of the tie rod is connected to the steering frame by a first bushing, wherein the upper arm and the lower arm are connected to the steering frame by a second bushing, and wherein bump steering characteristic of the wheel is determined by a difference in stiffness of the first bushing and the second bushing.

9. The independent steering system of claim 8, wherein the tie rod is configured such that when stiffness of the first bushing is relatively greater than the stiffness of the second bushing, the bump steering characteristic of the wheel is determined as oversteering.

10. The independent steering system of claim 8, wherein the tie rod is configured such that when stiffness of the first bushing is relatively smaller than the stiffness of the second bushing, the bump steering characteristic of the wheel is determined as understeering.

11. The independent steering system of claim 8, further comprising:

a controller configured to control the independent steering system to align bump steering characteristic of the wheel with bump steering characteristic of another wheel of the vehicle.

12. The independent steering system of claim 11, wherein aligning of the bump steering characteristic of the wheel is performed by adjusting the height of the second end of the tied rod.

13. The independent steering system of claim 1, further comprising:

a controller configured to control the independent steering system to align bump steering characteristic of the wheel with bump steering characteristic of another wheel of the vehicle.

14. The independent steering system of claim 13, wherein aligning of the bump steering characteristic of the wheel is performed by adjusting the height of the second end of the tied rod.

15. A vehicle comprising:

a plurality of independent steering systems, wherein each of the plurality of independent steering systems comprises:

a knuckle configured to be fastened to a corresponding wheel of the vehicle;

an upper arm, wherein a first end of the upper arm is coupled to an upper end of the knuckle and a second end of the upper arm is coupled to a steering frame;

a lower arm, wherein a first end of the lower arm is coupled to a lower end of the knuckle and a second end of the lower arm is coupled to the steering frame; and a tie rod, wherein a first end of the tie rod is coupled to the knuckle and a second end of the tie rod is coupled to the steering frame, wherein a height of the second end of the tied rod is configured to be adjustable;

a processor configured to determine a travel mode; and a controller configured to control each of the independent steering systems such that as the travel mode is switched, each of the wheels of the vehicle has a same bump steering characteristic.

16. The vehicle of claim 15, wherein the controller is configured to control each of the independent steering systems to vary bump steering characteristic of at least one wheel of the wheels of the vehicle based on a change of a rotation direction of the at least one wheel and based on switching of the travel mode.

17. The vehicle of claim 15, wherein the first end of the tie rod is pivotably connected to a connection member extending unilaterally from the knuckle, and the second end of the tie rod is configured to move along a path of a guide slot provided in the steering frame such that as a position of the second end of the tie rod is varied relative to the first end of the tie rod, a bump steering characteristic of the corresponding wheel is changed.

18. The vehicle of claim 17, wherein the tie rod is configured such that when the second end of the tie rod is positioned above the first end of the tie rod, the bump steering characteristic of the corresponding wheel is determined as oversteering.

19. The vehicle of claim 17, wherein the tie rod is configured such that when the second end of the tie rod is positioned below the first end of the tie rod, the bump steering characteristic of the corresponding wheel is determined as understeering.

20. The vehicle of claim 17, wherein the guide slot is formed in an arc shape to allow the second end of the tie rod to move along a path of the arc shape.

* * * * *